(12) United States Patent
Zhang et al.

(10) Patent No.: US 12,339,361 B2
(45) Date of Patent: Jun. 24, 2025

(54) METHOD AND DEVICE FOR CONTROLLING LIDAR, LIDAR, AND STORAGE MEDIUM

(71) Applicant: SHENZHEN ZHUOYU TECHNOLOGY CO., LTD., Shenzhen (CN)

(72) Inventors: Guofang Zhang, Shenzhen (CN); Shaojie Shen, Shenzhen (CN); Lu Ma, Shenzhen (CN)

(73) Assignee: SHENZHEN ZHUOYU TECHNOLOGY CO., LTD., Shenzhen (CN)

( * ) Notice: Subject to any disclaimer, the term of this patent is extended or adjusted under 35 U.S.C. 154(b) by 1107 days.

(21) Appl. No.: 17/187,723

(22) Filed: Feb. 26, 2021

(65) Prior Publication Data
US 2021/0181348 A1    Jun. 17, 2021

Related U.S. Application Data

(63) Continuation of application No. PCT/CN2018/102935, filed on Aug. 29, 2018.

(51) Int. Cl.
| | |
|---|---|
| *G01S 17/89* | (2020.01) |
| *G01S 7/481* | (2006.01) |
| *G01S 7/486* | (2020.01) |
| *G01S 7/491* | (2020.01) |

(52) U.S. Cl.
CPC ............ *G01S 17/89* (2013.01); *G01S 7/4814* (2013.01); *G01S 7/491* (2013.01); *G01S 7/4868* (2013.01)

(58) Field of Classification Search
CPC .......... G01S 7/84; G01S 7/491; G01S 17/931
See application file for complete search history.

(56) References Cited

U.S. PATENT DOCUMENTS

| | | | | |
|---|---|---|---|---|
| 4,950,075 A | * | 8/1990 | Ichinose | G01N 21/538 356/342 |
| 5,838,239 A | * | 11/1998 | Stern | B64D 15/20 356/369 |
| 2005/0234527 A1 | * | 10/2005 | Slatkine | A61B 90/04 601/7 |
| 2017/0373454 A1 | | 12/2017 | Hay et al. | |
| 2018/0088238 A1 | | 3/2018 | Garde et al. | |

(Continued)

FOREIGN PATENT DOCUMENTS

| | | |
|---|---|---|
| CN | 102362220 A | 2/2012 |
| CN | 102496849 A | 6/2012 |
| CN | 103152525 A | 6/2013 |

(Continued)

OTHER PUBLICATIONS

ANSI, 2000 "American National Standard for Safe Use of Lasers" Laser Institute of America (Year: 2000).*

(Continued)

*Primary Examiner* — Isam A Alsomiri
*Assistant Examiner* — Joseph C Fritchman

(57) ABSTRACT

The present disclosure provides a method for controlling a lidar device. The method includes obtaining a first irradiation amount or a first irradiance generated by the lidar device on a laser irradiated object; and controlling the lidar device based on the first irradiation amount or the first irradiance.

18 Claims, 6 Drawing Sheets

(56) References Cited

U.S. PATENT DOCUMENTS

2018/0136331 A1* 5/2018 Rosenzweig ........... G01S 17/93

FOREIGN PATENT DOCUMENTS

| | | |
|---|---|---|
| CN | 105373223 A | 3/2016 |
| CN | 106296716 A | 1/2017 |
| CN | 107436430 A | 12/2017 |
| CN | 108281880 A | 7/2018 |
| CN | 108376251 A | 8/2018 |
| CN | 108376252 A | 8/2018 |
| EP | 2485064 A1 | 8/2012 |
| JP | 2012122827 A | 6/2012 |

OTHER PUBLICATIONS

The World Intellectual Property Organization (WIPO) International Search Report for PCT/CN2018/102935 May 21, 2019 6 pages.

* cited by examiner

METHOD AND DEVICE FOR CONTROLLING LIDAR, LIDAR, AND STORAGE MEDIUM

CROSS-REFERENCE TO RELATED APPLICATION

This application is a continuation of International Application No. PCT/CN2018/102935, filed on Aug. 29, 2018, the entire content of which is incorporated herein by reference.

TECHNICAL FIELD

The present disclosure relates to the technical field of lidar technology and, more specifically, to a method and device for controlling a lidar, a lidar, and a storage medium.

BACKGROUND

Lidar is a system that emits laser beams to detect the position and speed of a target, and it has been widely used in the fields of medical devices, aviation, unmanned aerial vehicles, smart vehicles, etc. However, when the laser beam emitted by lidar exceeds a certain energy level, it will cause temporary or permanent damage to the human body. When the laser beam energy exceeds a certain limit, it may also cause other devices to work abnormally or damage the devices, cause property damage, or even fire. The hazards of different levels of lidar are shown in the following table.

| Level | Description |
| --- | --- |
| 1 | Not dangerous |
| 1M | No danger without using a condenser |
| 2 | No danger in a short amount of time, and can cause chronic visual damage if the radiation time is too long |
| 2M | Will not harm the eyes and skin during the protective reaction time if a condenser is not used |
| 3R | Direct exposure to the laser is dangerous and will hurt the eyes |
| 3B | Radiation is very dangerous and can harm eyes or skin |
| 4 | Very dangerous to the eyes and dangerous to the skin, possibly due to fire or explosion |

In the actual use of laser products, most products avoid risks through warning labels, explanation labels, or operating instructions, and rely on the professionalism and responsibility of the operators to prevent harmful laser beams from causing adverse hazards. However, it is difficult to avoid incidents of laser injury or damage to other objects due to personal negligence, lack of awareness, or other reasons.

SUMMARY

One aspect of the present disclosure provides a method for controlling a lidar device. The method includes obtaining a first irradiation amount or a first irradiance generated by the lidar device on a laser irradiated object; and controlling the lidar device based on the first irradiation amount or the first irradiance.

Another aspect of the present disclosure provides a device for controlling a lidar. The device includes a processor; and a memory storing program instructions that, when being executed by the processor, cause the processor to obtain a first irradiation amount or a first irradiance generated by the lidar on a laser irradiated object; and control the lidar based on the first irradiation amount or the first irradiance.

Another aspect of the present disclosure provides a lidar apparatus. The lidar apparatus includes a laser emitting device; a laser receiving device; and a lidar control device configured to control the laser emitting device to emit a laser beam. The lidar control device includes a process and a memory storing program instructions that, when being executed by the processor, cause the processor to obtain a first irradiation amount or a first irradiance generated by the lidar on a laser irradiated object; and control the lidar based on the first irradiation amount or the first irradiance.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION OF THE EMBODIMENTS

In order to make the objectives, technical solutions, and advantages of the present disclosure more clear, the technical solutions in the embodiments of the present disclosure will be described below with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Unless otherwise defined, all the technical and scientific terms used in the present disclosure have the same or similar meanings as generally understood by one of ordinary skill in the art. As described in the present disclosure, the terms used in the specification of the present disclosure are intended to describe example embodiments, instead of limiting the present disclosure.

Exemplary embodiments will be described with reference to the accompanying drawings. In the case where there is no conflict between the exemplary embodiments, the features of the following embodiments and examples may be combined with each other.

Figure 1:
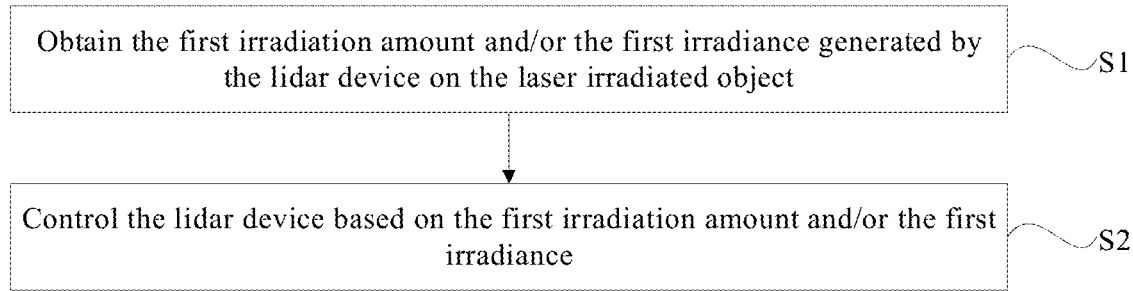
FIG. 1 is a flowchart of a method for controlling a lidar according to an embodiment of the present disclosure.

FIG. 1 is a flowchart of a method for controlling a lidar according to an embodiment of the present disclosure. As shown in FIG. 1, this embodiment provides a method for controlling a lidar, which can actively prevent the lidar from causing injury or damage to people or other objects when the lidar is used. The method will be described in detail below.

S1, obtaining a first irradiation amount and/or first irradiance generated by the lidar on a laser irradiated object.

The laser irradiated object may include people, animals, plants, or other objects. The first irradiance generated by the lidar on the laser irradiated object may be the radiation energy projected by the lidar on the unit area of the laser irradiated object per unit of time. The first irradiation amount generated by the lidar on the laser irradiated object may be the integrated amount of the first irradiance projected by the lidar on a certain surface of the laser irradiated object within a predetermined amount of time. The first irradiation amount and the first irradiance described above may both be used to indicate the intensity of the radiation in the radiation field.

In addition, the embodiments of the present disclosure do not limit the specific method of obtaining the first irradiation amount and/or the first irradiance, and those skilled in the art can set them based on the specific design needs. For example, an irradiation detector may be used to obtain the first irradiance and/or the first irradiation amount generated by the lidar on the laser irradiated object. In some embodiments, the irradiation detector may be a photoelectric detector, a photoacoustic detector, etc.

S2, controlling the lidar based on the first irradiation amount and/or the first irradiance.

Figure 2:
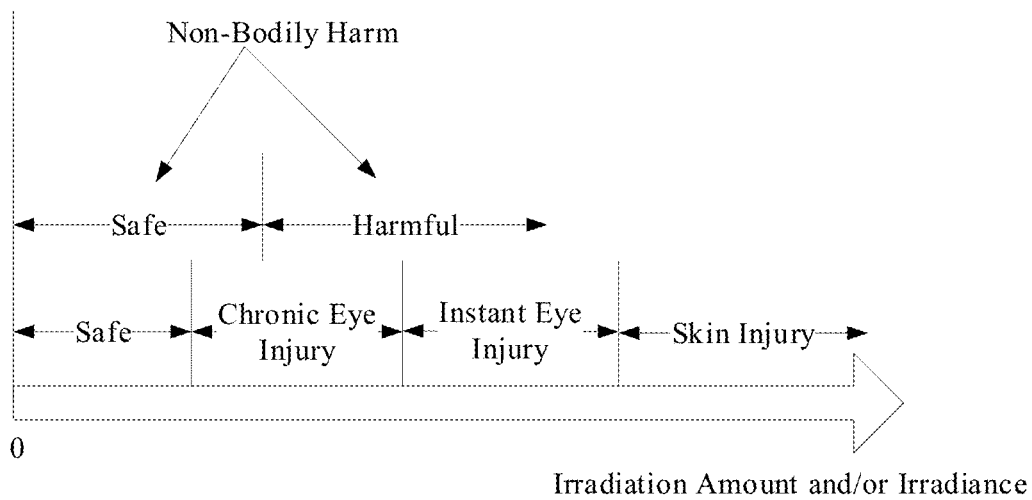
FIG. 2 is a schematic diagram of the influence of an irradiation amount and/or irradiance according to an embodiment of the present disclosure.

Since different irradiation amount and/or irradiance will have different effects on different laser irradiated objects, as shown in FIG. 2, when the laser irradiated object is human, different radiation amount and/or irradiance may have different effects on the human eyes or skin, such as (1) it is safe for the eyes and the skin, (2) it will cause chronic eye injury, (3) it will cause immediate eye injury, (4) it will cause skin injury, etc. In general, the greater the irradiation amount and/or the irradiance, the greater the damage to the object.

Subsequently, after obtaining the first irradiation amount and/or the first irradiance, the first irradiation amount and/or the first irradiance can be analyzed and processed to determine whether the lidar is safe to use, and the lidar can be controlled based on the analysis and processing results to ensure the safe use of the lidar. In one embodiment, the first irradiation amount can be obtained, and the lidar can be controlled based on the first irradiation amount. For example, when the first irradiation amount is greater than or equal to an irradiation amount threshold, predetermined protective measures can be taken for the lidar. The predetermined protective measures may include actively reducing the power of the lidar, turning off the voltage, turning off the lidar, etc., to ensure the safe use of the lidar, and to ensure that people of other objects are protected from injury or damage. When the first irradiation amount is less than the irradiation amount threshold, it may indicate that the lidar is safe to use at this time, and the lidar can be controlled to continue to maintain the current working state.

In another embodiment, the first irradiance can be obtained, and the lidar can be controlled based on the first irradiance. For example, when the first irradiance is greater than or equal to an irradiance threshold, predetermined protective measures can be taken for the lidar to ensure the safe use of the lidar. When the first irradiance is less than the irradiance threshold, it may indicate that the lidar is safe to use at this time, and the lidar can be controlled to continue to maintain the current working state.

In another embodiment, the first irradiation amount and/or the first irradiance can be obtained, and the lidar can be controlled based on the first irradiation amount and/or the first irradiance. For example, the first irradiation amount can be analyzed and compared with a predetermined irradiation amount threshold and the first irradiance can be analyzed and compared with a irradiance threshold, when the first irradiation amount is greater than or equal to the predetermined irradiation amount threshold, or the first irradiance is greater than or equal to the predetermined irradiance threshold, predetermined protective measures can be taken for the lidar to ensure the safe use of the lidar. Of course, those skilled in the art can also use other similar analysis and processing methods, as long as the safety of the lidar can be determined, which is not limited in the present disclosure.

The lidar control method provided in this embodiment of the present disclosure can obtain the first irradiation amount and/or the first irradiance generated by the lidar on the laser irradiated object, and the lidar can be controlled based on the first irradiation amount and/or the first irradiance. In this way, the difficulty of avoiding laser injury or damage to other objects in conventional technology can be addressed the protection function of abnormal lidar can be realized, the safe use of the lidar can be ensured, and the laser irradiated object can be prevented from being injured or damaged, thereby improving the safety and reliability of the control method.

Figure 3:
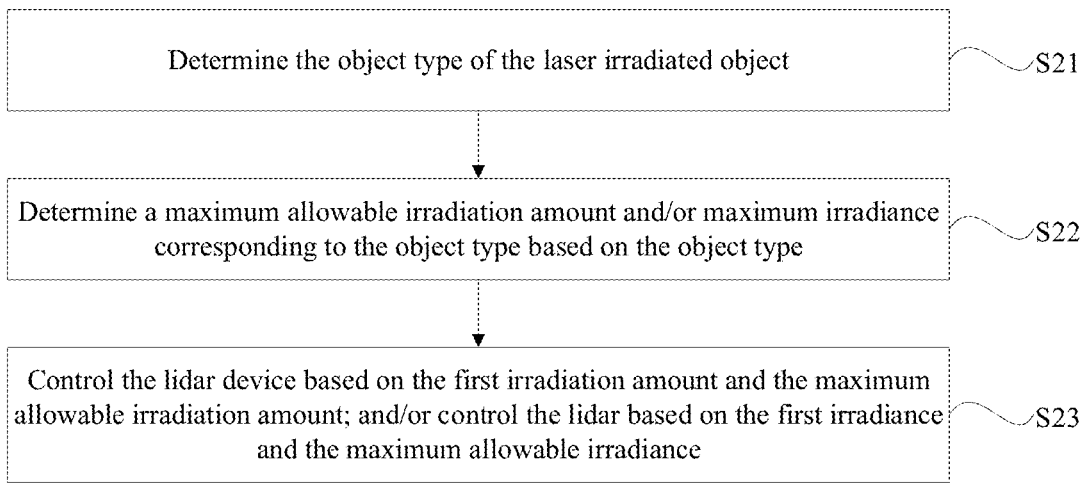
FIG. 3 is a flowchart of controlling the lidar based on a first irradiation amount and/or a first irradiance according to an embodiment of the present disclosure.

FIG. 3 is a flowchart of controlling a lidar based on the first irradiation amount and/or the first irradiance according to an embodiment of the present disclosure. Based on the foregoing embodiment and referring to FIG. 3, it can be seen that the embodiments of the present disclosure do not limit the specific implementation of controlling the lidar based on the first irradiation amount and/or the first irradiance, and those skilled in the art can adjust the implementation based on design needs. In this embodiment, the controlling the lidar based on the first irradiation amount and/or the first irradiance includes the following processes.

S21, determining the object type of the laser irradiated object.

The same irradiation amount and/or irradiance of the lidar can have different effects on different laser irradiated objects. For example, the radiation intensity of the lidar to a laser irradiated object A may be H, and the radiation intensity of the lidar to a laser irradiated object B may also be H. The types of the laser irradiated object A and the laser irradiated object B may be different. At this time, the radiation intensity H generated by the lidar may be safe for the laser irradiated object A, but the radiation intensity H generated by the lidar may cause damage to the laser irradiated object B. Therefore, to ensure the accuracy and reliability of the method, it may be needed to determine the object type of the laser irradiated object.

In the embodiments of the present disclosure do not limit the specific implementation of determining the object type of the laser irradiated object, and those skilled in the art can set it based on the design needs. In one embodiment, contour data of the laser irradiated object may be obtained through the lidar. More specifically, the point cloud data corresponding to the laser irradiated object can be obtained by the lidar, and the contour data of the laser irradiated object can be determined based on the point cloud data, and then the object type can be determined based on the contour data. More specifically, the contour data can be analyzed and matched with the predetermined standard contour data, and the standard type corresponding to the standard contour data can be determined as the object type of the laser irradiated object. In another embodiment, a photosensitive sensor and a temperature sensor can be combined to obtain the optical information and temperature information of the laser irradiated object, and the type of the laser irradiated object can be determined based on the optical information and the temperature information. Of course, those skilled in the art can also use other methods to determine the object type of the laser irradiated object, as long as the accuracy and reliability of the determination of the object type of the laser irradiated object can be ensured, which will not be repeated herein.

S22, determining a maximum allowable irradiation amount and/or maximum irradiance corresponding to the object type based on the object type.

In some embodiments, the maximum allowable irradiation amount may be the lower limit irradiation amount that may not cause damage or injury to the laser irradiated object during use. When the first irradiation amount is greater than or equal to the maximum allowable irradiation amount, the lidar may cause damage or injury to the laser irradiated object. Similarly, the maximum allowable irradiance may be the lower limit irradiance value at which the lidar may not cause damage or injury to the laser irradiated object during use. When the first irradiance is greater than or equal to the maximum allowable irradiance, the lidar may cause damage or injury to the laser irradiated object.

For different types of laser irradiated objects, the maximum allowable irradiation amount and/or the maximum allowable irradiance may not be the same, and the maximum allowable irradiation amount and/or the maximum allowable irradiance corresponding to the object type may need to be determined. More specifically, the correspondence between the laser irradiated object and the maximum allowable irradiation amount and/or the maximum allowable irradiance can be stored in a predetermined lookup table. Therefore, the maximum allowable irradiation amount and/or the maximum allowable irradiance corresponding to the laser irradiated object can be determined based on the correspondence lookup table.

S23, controlling the lidar based on the first irradiation amount and the maximum allowable irradiation amount; and/or, controlling the lidar based on the first irradiance and the maximum allowable irradiance.

In some embodiments, controlling the lidar based on the first irradiation amount and the maximum allowable irradiation amount; and/or, based on the first irradiance and the maximum allowable irradiance may include the following processes.

S231, controlling the lidar based on a predetermined control strategy when the first irradiation amount is greater than or equal to the maximum allowable irradiation amount; and/or, controlling the lidar based on the predetermined control strategy when the irradiance is greater than or equal to the maximum allowable irradiance.

In one embodiment, the first irradiation amount and the maximum allowable irradiation amount can be analyzed and compared. When the first irradiation amount is greater than or equal to the maximum allowable irradiation amount, it indicates that the lidar may cause damage to the laser irradiated object at this time. Therefore, to avoid the above situation, it may be needed to control the lidar based on the predetermined control strategy to ensure the safe use of the lidar, and to ensure that the laser irradiated object will not be damaged or harmed.

In another embodiment, the first irradiance and the maximum allowable irradiance can be analyzed and compared. When the first irradiance is greater than or equal to the maximum allowable irradiance, it indicates that the lidar may cause damage to the laser irradiated object at this time. Therefore, to avoid the above situation, it may be needed to control the lidar based on the predetermined control strategy to ensure the safe use of the lidar, and to ensure that the laser irradiated object will not be damaged or harmed.

In another embodiment, the first irradiation amount and the maximum allowable irradiation amount can be analyzed and compared, and the first irradiance and the maximum allowable irradiance can be analyzed and compared, when the first irradiation amount is greater than or equal to the maximum allowable irradiation amount, and/or the first irradiance is greater than or equal to the maximum allowable irradiance, it indicates that the lidar may cause damage to the laser irradiated object at this time. Therefore, to avoid the above situation, it may be needed to control the lidar based on the predetermined control strategy to ensure the safe use of the lidar, and to ensure that the laser irradiated object will not be damaged or harmed.

It can be understood that the method may further include, when the first irradiation amount is less than the maximum allowable irradiation amount, and the first irradiance is less than the maximum allowable irradiance, if may indicate that the lidar is in a safe working state and will not cause damage or harm to the laser irradiated object. As such, the lidar can be controlled to maintain the current working state.

In addition, to ensure the safe use of the lidar and to ensure that the laser irradiated object will not be damaged or harmed, this embodiment does not limit the specific implementation of the control strategy, and those skilled in the art can make arbitrary settings based on the actual needs. In some embodiments, controlling the lidar based on the predetermined control strategy may include the following processes.

S2311, turning off the lidar.

In some embodiments, turning off the lidar may include turning off the power of the lidar, or closing the exit aperture of the lidar. It should be noted that closing the exit aperture of the lidar can prevent the lidar from emitting the laser beam to the laser irradiated object, such that the effect of stopping the use of the lidar can also be achieve.

S2312, reducing the power of the lidar for emitting the laser beam.

When the lidar can cause damage or harm to the laser irradiated object, in order to ensure that the laser irradiated object is not damaged or harmed, the power of the emitted laser beam can be reduced, thereby changing the first irradiation amount and/or the first irradiance of the laser irradiated object. The specific reduction range can be set based on the specific design needs. For example, the power of the emitted laser beam can be reduced by 50%, 60%, 80%, etc., as long as it can be ensured that after reducing the power of the emitted beam, the first irradiation amount and/or the first irradiance generated by the lidar will not cause damage or harm to the laser irradiated object, which will not be repeated herein.

In some embodiments, reducing the first irradiation amount and/or the second irradiation amount generated by the lidar to the laser irradiated object may be a dynamic adjustment process because the damage or harm a lidar can cause to the laser irradiated object can be instantaneous or continuous.

Figure 4:
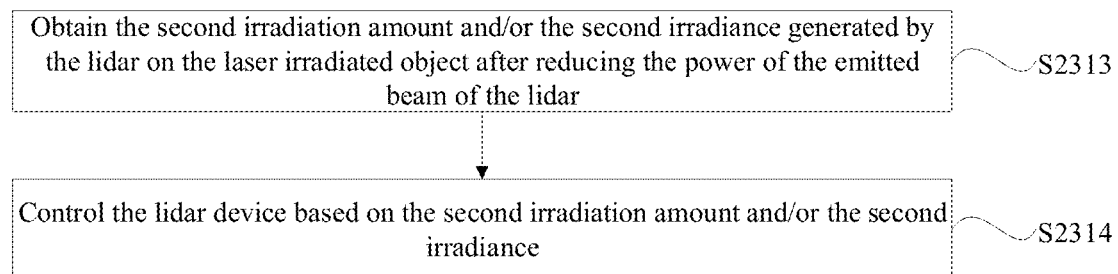
FIG. 4 is a flowchart of another method of controlling the lidar according to an embodiment of the present disclosure.
Figure 5:
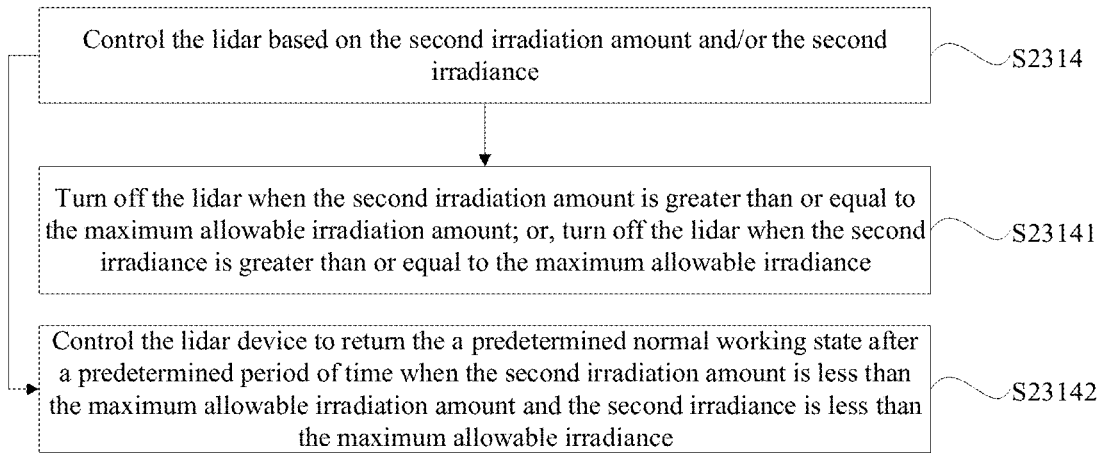
FIG. 5 is a flowchart of controlling the lidar based on a second irradiation amount and/or a second irradiance according to an embodiment of the present disclosure.

FIG. 4 is a flowchart of another method of controlling the lidar according to an embodiment of the present disclosure. FIG. 5 is a flowchart for controlling the lidar based on the second irradiation amount and/or the second irradiance according to an embodiment of the present disclosure. Based on the foregoing embodiments and referring to FIG. 4 and FIG. 5, to improve the safety and reliability of the method, the method can include the following processes.

S2313, obtaining the second irradiation amount and/or the second irradiance generated by the lidar on the laser irradiated object after reducing the power of the emitted beam of the lidar.

After reducing the power of the emitted beam of the lidar, to further ensure the safe use of the lidar, the working state of the lidar may need to be determined again, and then the second irradiation amount and/or the second irradiance generated by the lidar on the laser irradiated object can be obtained. In some embodiments, to ensure the accuracy and reliability of the acquisition of the second irradiation amount and/or the second irradiance, the second irradiation amount and/or the second irradiance may be obtained after the adjustment of the lidar is completed and a certain predetermined period of time has passed in order to avoid a certain volatility in the second irradiation amount and/or the second irradiance during the initial period of time when the lidar is adjusted, which can further affect the accuracy of the determination of the working state of the lidar.

S2314, controlling the lidar based on the second irradiation amount and/or the second irradiance.

After obtaining the second irradiation amount and/or the second irradiance, the second irradiation amount and/or the second irradiance can be analyzed and processed to determine whether the lidar is safe to use after being reduced. More specifically, controlling the lidar based on the second irradiation amount and/or the second irradiance may include the following processes.

S23141, turning off the lidar when the second irradiation amount is greater than or equal to the maximum allowable irradiation amount; or, turning off the lidar when the second irradiance is greater than or equal to the maximum allowable irradiance.

The specific implementation process and effect of the process at S23141 are similar to the specific implementation process and effect of the process at S231 in the above embodiment. For details, reference may be made to the above corresponding description.

S23142, controlling the lidar to return the a predetermined normal working state after a predetermined period of time when the second irradiation amount is less than the maximum allowable irradiation amount and the second irradiance is less than the maximum allowable irradiance.

When the second irradiation amount is less than the maximum allowable irradiation amount and the second irradiance is less than the maximum allowable irradiance, at this time, it may indicate that after the adjustment, the use of lidar is in a safe state and will not cause damage or harm to the laser irradiated object. Therefore, the lidar can be controlled to return to the predetermined normal working state after a delay of a certain period of time.

By obtaining the second irradiation amount and/or the second irradiance generated by the lidar on the laser irradiated object, the lidar can be controlled based on the second irradiation amount and/or the second irradiance, which can effectively ensure the safe use of the lidar. In addition, after determining the safe use of the lidar, the working state of the lidar can be adjusted in time, thereby improving the working efficiency of the lidar.

Further, when the first irradiation amount is greater than or equal to the maximum allowable irradiation amount, or, the first irradiance is greater than or equal to the maximum allowable irradiance, the method may further include the following process.

S201, sending a radiation over-limit signal to a predetermined human-machine interface, such that the human-machine interface can send warning information to the user based on the radiation over-limit signal.

In some embodiments, the warning information may include at least one of a sound alarm, a light alarm, a vibration alarm, etc. More specifically, when the first irradiation amount is greater than or equal to the maximum allowable irradiation amount, it may indicate that the lidar radiation is exceeding the limit. If the lidar is used as this time, it may cause damage or harm to the laser irradiated object. Therefore, to improve the practicability of this method, the radiation over-limit signal can be sent to the predetermined human-machine interface, such that the human-machine interface can send warming information to the user based on the radiation over-limit signal, and remind the user to adjust and control the lidar in time.

Figure 6:
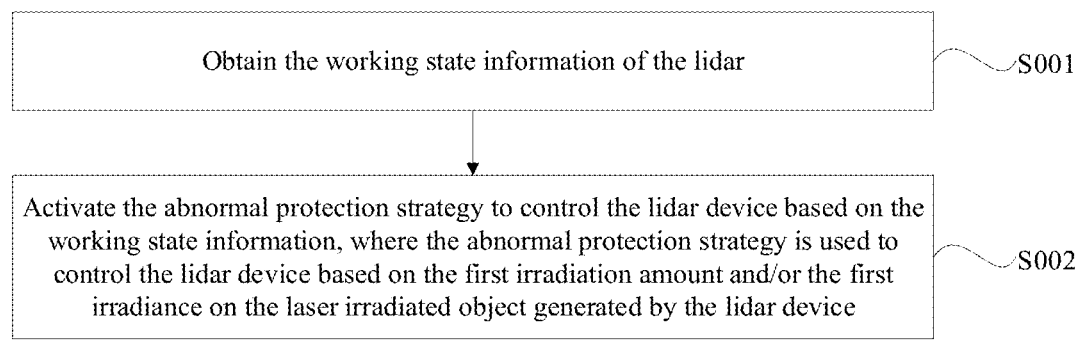
FIG. 6 is a flowchart of another method of controlling the lidar according to an embodiment of the present disclosure.
Figure 7:
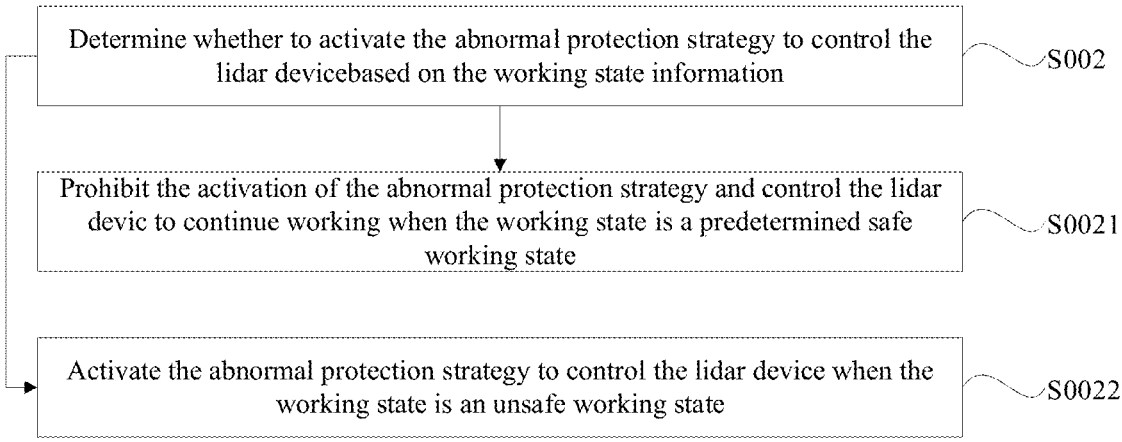
FIG. 7 is a schematic diagram of a process of determining an activation of an abnormal protection strategy to control the lidar based on working state information according to an embodiment of the present disclosure.

FIG. 6 is a flowchart of another method of controlling the lidar according to an embodiment of the present disclosure. FIG. 7 is a flowchart of a process for determined whether to activate an abnormal protection strategy to control the lidar based on the working state information according to an embodiment of the present disclosure. Based on the foregoing embodiments and referring to FIG. 6 and FIG. 7, the method in this embodiment includes the following processes.

S001, obtaining working state information of the lidar.

In some embodiments, the working state information may include working state information for manual participation, working state information for autonomous operation, other predetermined working states, working environment information where the lidar is positioned, etc.

S002, activating the abnormal protection strategy to control the lidar based on the working state information, where the abnormal protection strategy may be used to control the lidar based on the first irradiation amount and/or the first irradiance on the laser irradiated object generated by the lidar.

In some embodiments, activating the abnormal protection strategy based on the working state information may include the following processes.

S0021, prohibiting the activation of the abnormal protection strategy and controlling the lidar to continue working when the working state is a predetermined safe working state.

In some embodiments, when the lidar is in the predetermined safe working state, it will not cause unsafe incidents, that is, it will not cause damage or harm to the laser irradiated object. Further, when it is determined that the working state of the lidar is a safe working state, the lidar can continue to operate normally. At this time, there is no need to activate the abnormal protection strategy, and the lidar can be controlled to continue working. That is, there is no need to control the lidar based on the first irradiation amount and/or the first irradiance at this time, such that the abnormal protection strategy of the lidar can be temporarily turned off.

In some embodiments, when the working state of the lidar is the predetermined state working state, the lidar can also support manual activation configuration and management of various working states to realize the safety protection of use of the lidar, thereby preventing the lidar from being interfered or affected by the external environment or external non-hazardous abnormal conditions (such as rain, snow, sane, flying insects, floating leaves, etc.), and the lidar cannot continue to work normally, thereby becoming dangerous to use or causing unsafe incidents.

In addition, when the safe working state includes external non-hazardous abnormal conditions, the external non-hazardous abnormal conditions may include one or more of abnormal conditions of rain and snow, abnormal conditions of insects, or abnormal conditions of floating leaves. More specifically, the specific non-hazardous abnormal conditions can be determined by detecting external data and analyzing the external environmental data.

In some embodiments, environmental sensors can be used for detecting external data. For example, rain and snow sensors can be used to detect rain and snow data, and cameras, optical sensors, or infrared sensors can be used to detect flying insect data or floating leaf data. Based on the analysis on the rain and snow data, flying insect data, or floating leaf data, whether the external environment is a predetermined non-hazardous abnormal condition can be determined. For example, if the rain and snow data matches the standard rain and snow data corresponding to the predetermined non-hazardous abnormal condition, it can be determined that the external environment at this time is the predetermined non-hazardous abnormal condition. Similarly, it is also possible to determine whether the external environment is the predetermined non-hazardous abnormal condition based on the flying inset data or the floating leaf data.

In some other embodiments, external data can also be obtained using a different method. Since the laser beam emitted by the lidar can encounter different laser irradiated objects, there may be different degrees of attenuations, and the laser beam emitted by the lidar may also have different degrees of attenuations for the same laser irradiated object in different external environments. Therefore, the attenuation information of the lidar may be determined by the laser data of the lidar in the external environment. The attenuation information may be instantaneous attenuation information, or the attenuation information may also be attenuation information within a period of time. The specific external environment can be determined based on the attenuation information. More specifically, the attenuation information can be analyzed and compared with predetermined standard attenuation information, and the standard external environment corresponding to the standard attenuation information can be determined as the current external environment where the lidar is positioned.

For example, the laser data of the lidar in the external environment A may be determined as attenuation information H1, the laser data of the lidar in the external environment B may be determined as attenuation information H2, and the laser data of the lidar in the external environment C may be determined as attenuation information H3. The attenuation information H1, H2, and H3 can be analyzed to determine that the standard external environment corresponding to the attenuation information H1 may be an abnormal condition of rain and snow, the standard external environment corresponding to the attenuation information H2 may be an abnormal condition of insects, and the standard external environment corresponding to the attenuation information H3 may be an abnormal condition of floating leaves. At this time, the external environment A may be determined as an abnormal condition of rain and snow, the external environment B may be determined as an abnormal condition of insects, and the external environment C may be determined as an abnormal condition of floating leaves.

In the aforementioned working scenarios, when the carrier of the lidar is in abnormal weather conditions such as rain and snow, it often means that the lidar is working in a relatively abnormal environment, and it is needed to ensure that the lidar is in the working condition to prevent accidents. For example, in an unmanned vehicle with lidar or an ADAS system with a level three of higher lidar, if the lidar is actively turned off or the output power of the laser is reduced during rain and snow, it may be dangerous for driving. Under such weather conditions, the rain and snow itself will also absorb the laser, thereby greatly reducing the radiation of the laser on objects (including the human body) in the detection area. Therefore, in this case, the output power of the lidar may not be reduced and/or the lidar may not be turned off.

In the aforementioned working scenarios, objects such as flying insects and fallen leaves can affect the distance measurement of the lidar. Since flying objects such as flying insects and fallen leaves will be measured by the lidar as close-up objects, the logic of excessive will be generated, and the loser output device can be controlled to reduce the output power or even shut down. At the same time, radiation to close objects such as insects and fallen leaves may not cause adverse consequences. Therefore, when lidar detects objects that are not affected by radiation at close range, it may not control the output of the laser.

Therefore, when the lidar is in the above-mentioned external environment or external non-hazardous abnormal conditions, or when the lidar will not cause danger or damage to the laser irradiated object and will not cause unsafe incidents, in order to avoid interference or influence on the work of the lidar, the abnormal protection strategy can be prohibited from being activated, and the lidar can be controlled to continue working, which not only realizes the safe use of the lidar, but also ensures the efficiency of the lidar.

S0022, activating the abnormal protection strategy to control the lidar when the working state is an unsafe working state.

When the working state of the lidar is an unsafe working state, it means that the lidar may cause unsafe incidents, that is, cause danger or damage to the laser irradiated object. Further, when it is determined that the working state of the lidar is an unsafe working state, the abnormal protection strategy of the lidar can be activated. That is, the lidar can be controlled based on the first irradiation amount and/or the first irradiance to ensure the safe use of the lidar.

In this embodiment, the working state information of the lidar can be obtained, and the abnormal protection strategy of the lidar based on the working state information can be controlled. More specifically, when the working state is in the predetermined safe working state, the abnormal protection strategy of the lidar can be temporarily turned off, and the lidar can be controlled to continue working; and, when the working state is an unsafe working state, the abnormal protection strategy of the lidar can be turned on. That is, the lidar can be controlled based on the first irradiation amount and/or the first irradiance, which further ensures the safe use of the lidar and improves the safety and reliability of the method.

Figure 8:
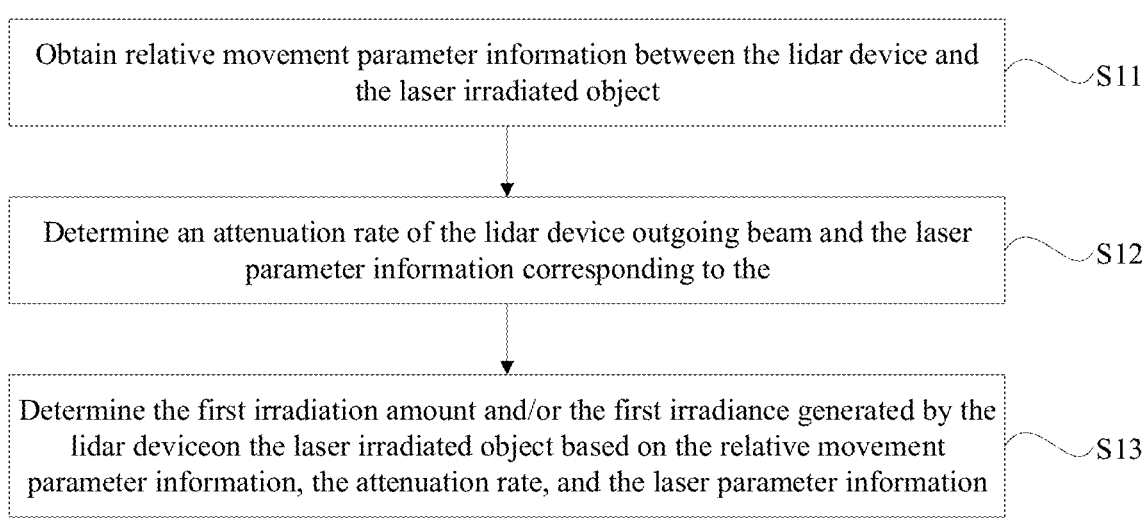
FIG. 8 is a schematic diagram of a process of obtaining the first irradiation amount and/or the first irradiance generated by the lidar on a laser irradiated object according to an embodiment of the present disclosure.
Figure 9:
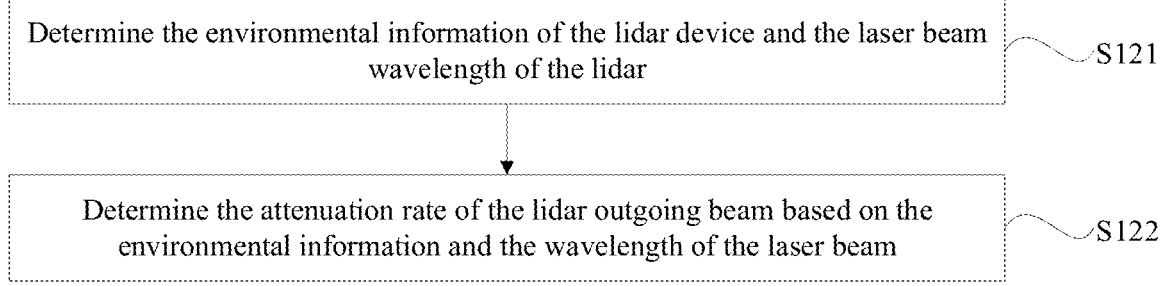
FIG. 9 is a schematic diagram of a process for determining an attenuation rate of a lidar exiting beam according to an embodiment of the present disclosure.
Figure 10:
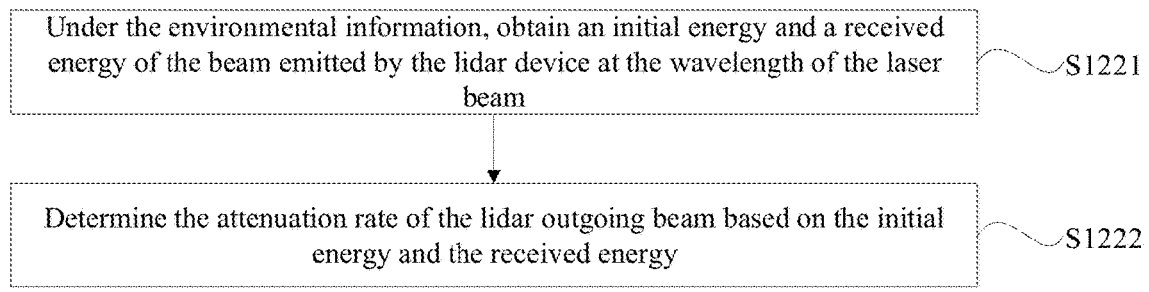
FIG. 10 is a schematic diagram of a process of determining the attenuation rate of the lidar exiting beam based on environmental information and a wavelength of the laser beam according to an embodiment of the present disclosure.

FIG. 8 is a schematic diagram of a process of obtaining the first irradiation amount and/or the first irradiance generated by the lidar on a laser irradiated object according to an embodiment of the present disclosure. FIG. 9 is a schematic diagram of a process for determining an attenuation rate of a lidar exiting beam according to an embodiment of the present disclosure. FIG. 10 is a schematic diagram of a process of determining the attenuation rate of the lidar exiting beam based on environmental information and a wavelength of the laser beam according to an embodiment of the present disclosure. Based on the foregoing embodiments and referring to FIG. 8 to FIG. 10, it can be seen that this embodiment does not limit the specific implementation method for obtaining the first irradiation amount and/or the first irradiance generated by the lidar on the laser irradiated object, and those skilled in the art can set it based on design needs. In some embodiments, the method for obtaining the first irradiation amount and/or the first irradiance generate by the lidar on the laser irradiated object may include the following processes.

S11, obtaining relative movement parameter information between the lidar and the laser irradiated object.

In some embodiments, the relative movement parameter information between the lidar and the laser irradiated object may include one or more of distance information between the lidar and the laser irradiated object, position information between the lidar and the laser irradiated object, relative speed information between the lidar and the laser irradiated object, or relative acceleration information between the lidar and the laser irradiated object.

In addition, the lidar can emit laser beams at a certain frequency. The laser beam can be reflected after reaching the laser irradiated object, and can be received by a receiving device in the lidar. By calculating the transmission time and the reception time of the same laser beam, the distance between the lidar and the laser irradiated object can be calculated. The calculation formula may be as follow:

$L=(Tr-Tt)*c/2$, where L is the distance between the laser irradiated object and the lidar, Tr is the time when the laser beam is received, Tt is the time when the laser beam is emitted, and c is the speed of light.

In some embodiments, the position information of the laser irradiated object may be obtained as follow. Lidar can use a broad-spectrum light source, and wavelength modulation can be performed on the broad-spectrum light source through a grating, such that lasers of different wavelengths can be directed to different airspaces. By detecting atmospheric echo signals in different airspaces (different wavelengths) and obtaining the specific position of the detected laser irradiated object through signal collection and analysis, the position information of the laser irradiated object can be obtained.

In some other embodiments, the emitted laser beam of the lidar may generated different attenuation information for the laser irradiated objects in different directions. For example, the laser irradiated objects in different directions may have different angles of exit surfaces. When the laser light emitted by the lidar is reflected from the exit surface at different angles, different energy attenuation information can be generated. Therefore, the specific position of the laser irradiated object can be determined based on the different energy attenuation information.

For example, the outgoing light beam of the lidar of the laser irradiated object in the F1 direction may be attenuation information W1, the outgoing light beam of the lidar of the laser irradiated object in the F2 direction may be attenuation information W2, and the outgoing light beam of the lidar of the laser irradiated object in the F3 direction may be attenuation information W3. The attenuation information W1, W2, and W3 can be analyzed, and the direction F1 corresponding to the attenuation information W1 may be determined as 90°, the direction F2 corresponding to the attenuation information W2 may be determined as 120°, and the direction F3 corresponding to the attenuation information W3 may be determined as 45°.

S12, determining an attenuation rate of the lidar outgoing beam and the laser parameter information corresponding to the lidar.

In some embodiments, the laser parameter information may include one of more of the initial emission radiation flux, the initial emission beam diameter, the scattering angle, or the transmittance. Generally, when the lidar is determined, the lidar parameter information can also be determined information. That is, for a specific lidar, the initial emission radiation flux, the initial emission beam diameter, the scattering angle, and the transmittance may be known parameters corresponding to the lidar.

In addition, determining the attenuation rate of the lidar outgoing beam may include the following processes.

S121, determining the environmental information of the lidar and the laser beam wavelength of the lidar.

In some embodiments, the environmental information may include one or more of the visibility information, the atmospheric pressure information, the temperature information, and the relative humidity information. The aforementioned environmental information can be detected by the corresponding detections devices. For example, visibility information can be obtained by using a visibility observer, the atmospheric pressure information can be obtained by using a barometer, the temperature information can be obtained by using a temperature sensor, and the relative humidity information can be obtained by using a humidity sensor, etc.

In addition, for the laser beam wavelength of the lidar, in some embodiments, after the lidar is determined, the wavelength of the laser beam may also be determined immediately. For example, the wavelength of the laser beam may be 960 nm, 1320 nm, 1550 nm, etc. corresponding to the lidar.

S122, determining the attenuation rate of the lidar outgoing beam based on the environmental information and the wavelength of the laser beam.

In some embodiments, after determining the environmental information and the wavelength of the laser beam, the environmental information and the wavelength of the laser beam can be analyzed and processed, and the attenuation rate of the lidar outgoing beam can be determined based on the analysis and processing results. More specifically, the attenuation rate can be determined by looking up a table based on the environmental information and the wavelength of the laser beam. Alternatively, the attenuation rate can be determined by using historical empirical data based on the environmental information, or the attenuation rate can be directly measured in the current environment.

For example, determining the attenuation rate of the lidar outgoing beam based on the environmental information and the wavelength of the laser beam may include the following processes.

S1221, under the environmental information, obtaining an initial energy and a received energy of the beam emitted by the lidar at the wavelength of the laser beam.

S1222, determining the attenuation rate of the lidar outgoing beam based on the initial energy and the received energy.

More specifically, after the initial energy and the received energy are obtained, the initial energy and the received energy can be analyzed and processed, and the attenuation rate of the lidar outgoing beam can be determined based on the analysis and processing results.

In some embodiments, the attenuation rate of the lidar outgoing beam can be determined by using the formula $a=\log(Pi/P)$, where a is the attenuation rate, Pi is the received energy, and P is the initial energy, that is, the attenuation rate is the logarithmic value of the (received energy Pi/the initial energy P).

In some embodiments, the attenuation rate of the lidar outgoing beam can be determined by using the formula $a=Pi/P$, where a is the attenuation rate, Pi is the received energy, and P is the initial energy, that is, the attenuation rate is the ratio of the received energy to the initial energy.

In some embodiments, the attenuation rate of the lidar outgoing beam can be determined by using the formula $a=(P-Pi)/P$, where a is the attenuation rate, Pi is the received energy, and P is the initial energy, that is, the attenuation rate is the ratio of (the initial energy-the received energy) to the initial energy.

S13, determining the first irradiation amount and/or the first irradiance generated by the lidar on the laser irradiated object based on the relative movement parameter information, the attenuation rate, and the laser parameter information.

After obtaining the distance information, the attenuation rate, and the laser parameter information, the first irradiation amount and/or the first irradiance can be determined based on the relative movement parameter information, the attenuation rate, and the laser parameter information. The first irradiance E may be equal to the radiation flux dφ incident on the surface of the laser irradiated object divided by the surface area of the laser irradiated object dA. The radiation flux may be the rate of change of the radiation energy with time $\Phi=dQ/dt$. The radiation energy can be determined based on the relative movement parameter information, the attenuation rate, and the laser parameter information. For example, the radiation energy can be determined based on the relationship between the relative movement parameter information, the attenuation rate, and the laser parameter information $Q=k1*L+k2*a+k3*M+k4*F$, where Q is the radiation energy, k1, k2, k3, and k4 are predetermined weight information, L is the distance information, a is the attenuation rate, M is the laser parameter information, and F is the direction information.

For the determination of the first irradiation amount and/or the first irradiance, in some embodiments, the distance information, the attenuation rate, and the laser parameter information may also be used to determine the first irradiation amount and/or the first irradiance generated by the lidar on the laser irradiated object. More specifically, the radiation energy can be determined based on the relationship between the distance information, the attenuation rate, and the laser parameter information $Q=k1*L+k2*a+k3*M$, where Q is the radiation energy, k1, k2, and k3 are predetermined weight information, L is the distance information, a is the attenuation rate, and M is the laser parameter information.

The first irradiation amount He can be equal to the integral of the first irradiance E that will be radiated to a certain surface of the object surface in time the, that is, $He=\int E\,dt$. The first irradiation amount can be determined based on the distance information, the attenuation rate, and the laser parameter information. Of course, those skilled in the art can also use other methods to determine the first irradiation amount and/or the first irradiance generated by the lidar on the laser irradiated object, as long as the accuracy and reliability of the determination of the first irradiation amount and/or the first irradiance can be ensure, which will not be repeated herein.

Figure 11:
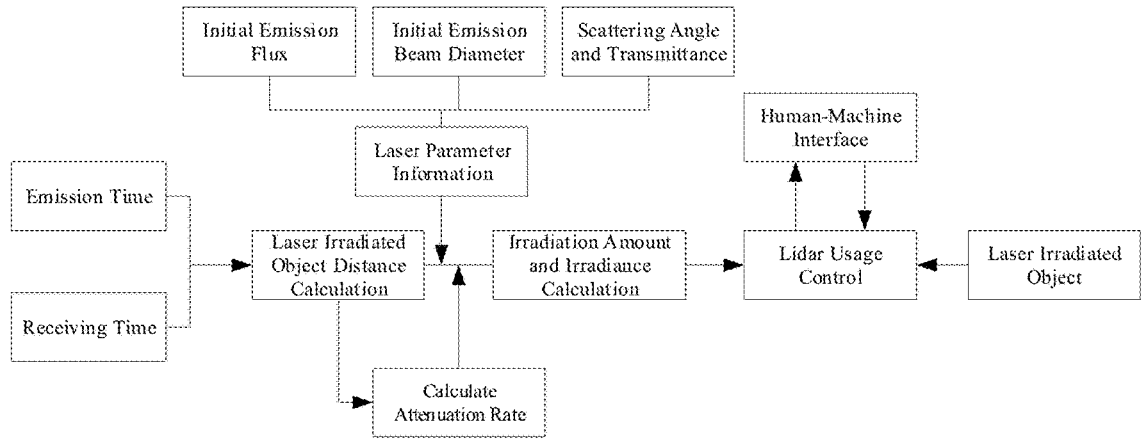
FIG. 11 is a flowchart of a lidar control method according to an embodiment of the present disclosure.

For specific applications, referring to FIG. 11, it can be seen that an embodiment of the present disclosure provides a lidar control method, which can calculate the distance information between the laser irradiated object (person or object) and the lidar by obtaining the lidar emission time and the receiving time, and the position information of the laser irradiated object can also be determined by using the lidar. At the same time, based on the lidar's initial emission flux, initial emission beam diameter, scattering angle, attenuation rate, and relative movement parameter information between the laser irradiated object and the lidar, the first irradiation amount and/or the first irradiance generated by the lidar on the laser irradiated object can be calculated.

In some embodiments, the lidar may obtain the current visibility information, atmospheric pressure information, temperature information, relative humidity and other information through external detection devices. Combining information such as the wavelength of the laser beam, the relative movement parameter information, and the predetermined attenuation rate calculation model, the current attenuation rate of the lidar outgoing beam can be calculated. The first irradiation amount and/or the first irradiance can be calculated based on the attenuation rate, the relative movement parameter information, the initial emission flux, the initial emission beam diameter, the scattering angle, and the transmittance. Subsequently, the first irradiation amount and/or the first irradiance generated by the lidar on the laser irradiated object can be obtained.

In addition, based on the current lidar wavelength, the exposure and/or intensity that may cause chronic eye injury, eye injury, skin injury, and specific object injury can be determined. That is, the maximum allowable irradiation amount and/or the maximum allowable irradiance can be obtained. Alternatively, other equivalent data may be used to obtain the maximum allowable irradiation amount and/or the maximum allowable irradiance. When the type of laser irradiated object is human, the limit on eye injury and skin injury can refer to other equivalent data. For the limit of damage or injury caused of objects, external personnel may configure the corresponding parameters through the human-machine interface.

When the lidar is in use, whether the current first irradiation amount and/or first irradiance exceeds the maximum allowable irradiation amount and/or the maximum allowable irradiance can be determined based on the type of laser irradiated object, the first irradiation amount and/or the first irradiance, and the maximum allowable irradiation amount and/or the maximum allowable irradiance. When the corresponding limit is exceeded, a radiation over-limit signal can be automatically sent out. At this time, the lidar can take the following measures based on the actual situation. (1) Turn off the lidar directly, more specifically, the power of the lidar can be turned off or the aperture of the lidar can be closed; (2) the working state of the lidar can be switched to a safe irradiation amount and/or safe irradiance working state. After switching to the safe state, if the radiation over-limit signal is still received after exceeding an allowable period of time, then the lidar can be turned off. If the radiation over-limit signal disappears for a certain period of time, the lidar can automatically return to the original working state. Further, when the lidar radiation is over the limit, the radiation over-limit signal can be sent to the human-machine interface, and the human-machine interface may send out an alarm instruction to remind the user to adjust and control the lidar.

In addition, it should be noted that under certain working states, when it is determined that the lase will not cause unsafe incidents and needs to continue normal operation, at this time, the lidar may temporarily disable the abnormal protection strategy of the lidar based on the received working state information in order to avoid the interference or influence of the external environment or external non-hazardous abnormal conditions (such as rain, snow, sand, flying insects, floating leaves, etc.), such that the lidar cannot continue to work normally, thereby becoming dangerous to use or causing unsafe incidents.

In the lidar control method provided by this embodiment, based on the laser ranging technology, laser attenuation calculation, and active safety control and protection technology, by analyzing the degree of damage of the laser beam energy hitting on the laser irradiated object under different working conditions of the lidar to the laser irradiated object, abnormal protection methods such as actively reducing the power of the laser product or turning off the power can be used. As such, the laser irradiated object can be prevented from being damaged or harmed, and the safety and reliability of the method can be effectively ensured.

Figure 12:
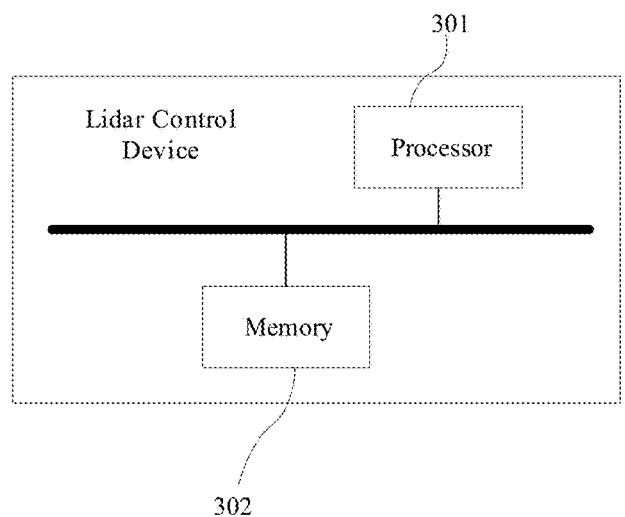
FIG. 12 is a structural diagram of a lidar control device according to an embodiment of the present disclosure.

FIG. 12 is a structural diagram of a lidar control device according to an embodiment of the present disclosure. Referring to FIG. 12, an embodiment of the present disclosure provides a lidar control device, which can execute the lidar control method described above.

More specifically, the lidar control device includes a memory 302 storing a computer program, and a processor 301 configured to execute the computer program stored in the memory 302. When executed by the processor 301, the computer program can cause the processor 301 to obtain the first irradiation amount and/or the first irradiance generated by the lidar on the laser irradiated object, and control the lidar based on the first irradiation amount and/or the first irradiance.

In some embodiments, when controlling the lidar based on the first irradiation amount and/or the first irradiance, the processor 301 can be configured to determine the object type of the laser irradiated object; determine the maximum allowable irradiation amount and/or the maximum allowable irradiance corresponding to the object type based on the object type; and, control the lidar based on the first irradiation amount and the maximum allowable irradiation amount; and/or, control the lidar based on the first irradiance and the maximum allowable irradiance.

In some embodiments, when controlling the lidar based on the first irradiation amount and the maximum allowable irradiation amount; and/or, controlling the lidar based on the first irradiance and the maximum allowable irradiance, the processor 301 can be configured to control the lidar based on the predetermined control strategy when the first irradiation amount is greater than or equal to the maximum allowable irradiation amount; and/or, control the lidar based on the predetermined control strategy when the first irradiance is greater than or equal to the maximum allowable irradiance.

In some embodiments, when controlling the lidar based on the predetermined control strategy, the processor 301 can be configured to turn off the lidar and stopping using the lidar, or reducing the power of the lidar outgoing beam.

In some embodiments, when turning off the lidar, the processor 301 can be configured to turn of the power of the lidar, or close the aperture of the lidar.

In some embodiments, the processor 301 can be configured to obtaining the second irradiation amount and/or second irradiance generated by the lidar on the laser irradiated object after reducing the power of the lidar outgoing beam; and controlling the lidar based on the second irradiation amount and/or the second irradiance.

In some embodiments, when controlling the lidar based on the second irradiation amount and/or the second irradiance, the processor 301 can be configured to turn off the lidar when the second irradiation amount is greater than or equal to the maximum allowable irradiation amount; or, turn off the lidar when the second irradiance is greater than or equal to the maximum allowable irradiance; or, control the lidar to return to the predetermined normal working state after a predetermined period of time when the second irradiation amount is less than the maximum allowable irradiation amount and the second irradiance is less than the maximum allowable irradiance.

In some embodiments, when the second irradiation amount is greater than or equal to the maximum allowable irradiation amount, or the second irradiance is greater than or equal to the maximum allowable irradiance, the processor 301 can be configured to send a radiation over-limit signal to the predetermined human-machine interface, such that the human-machine interface can send warning information to the user based on the radiation over-limit signal.

In addition, the processor 301 in this embodiment can be configured to obtain the working state information of the lidar; and determine whether to activate the abnormal protection strategy to control the lidar based on the working state information. In some embodiments, the abnormal protection strategy can be used to control the lidar based on the irradiation amount and/or the irradiance generated by the lidar on the laser irradiated object.

In some embodiments, when determining whether to activate the abnormal protection strategy to control the lidar based on the working state information, the processor 301 can be configured to prohibit the activation of the abnormal protection strategy and control the lidar to continue working when the working state is a predetermined safe working state, or activate the abnormal protection strategy to control the lidar when the working state is an unsafe working state.

In addition, when obtaining the irradiation amount and/or the irradiance generated by the lidar on the laser irradiated object, the processor 301 can be configured to obtain the relative movement parameter information between the lidar and the laser irradiated object; determine the attenuation rate of the lidar outgoing beam and the laser parameter information corresponding to the lidar; and determine the irradiation amount and/or the irradiance generated by the lidar on the laser irradiated object based on the relative movement parameter information, the attenuation rate, and the laser parameter information. In some embodiments, the relative movement parameter information between the lidar and the laser irradiated object may include one or more of distance information between the lidar and the laser irradiated object, position information between the lidar and the laser irradiated object, relative speed information between the lidar and the laser irradiated object, or relative acceleration information between the lidar and the laser irradiated object. Further, the laser parameter information may include one of more of the initial emission radiation flux, the initial emission beam diameter, the scattering angle, or the transmittance.

In some embodiments, when determining the attenuation rate of the laser outgoing beam, the processor 301 can be configured to determine the environmental information of the lidar and the laser beam wavelength of the lidar; and determine the attenuation rate of the lidar outgoing beam based on the environmental information and the laser beam wavelength. In some embodiments, the environmental information may include one or more of the visibility information, the atmospheric pressure information, the temperature information, or the relative humidity information.

In some embodiments, when determining the attenuation rate of the lidar outgoing beam based on the environmental information and the laser beam wavelength, the processor 301 can be configured to determine the attenuation rate by looking up a table based on the environmental information and the laser beam wavelength, or using historical empirical data to determine the attenuation rate based on the environmental information, or measuring the attenuation rate directly under the current environment.

For example, under the predetermined environmental information, the processor 301 can be configured to obtain an initial energy and a received energy of the beam emitted by the lidar at the wavelength of the laser beam; and determine the attenuation rate of the lidar outgoing beam based on the initial energy and the received energy.

The lidar control device in this embodiment can be used to implement the technical solutions of the embodiments shown in FIG. 1 to FIG. 11 in the foregoing method embodiments, and its implementation principles and technical effects are similar, and will not be repeated here.

Figure 13:
FIG. 13 is another structural diagram of the lidar control device according to an embodiment of the present disclosure.

FIG. 13 is another structural diagram of the lidar control device according to an embodiment of the present disclosure. Referring to FIG. 13, an embodiment of the present disclosure provides another lidar control device, which can execute the lidar control method described above.

More specifically, the lidar control device includes an acquisition module 101 configured to obtain the irradiation amount and/or the irradiance generated by the lidar on the laser irradiated object; and a control module 102 configured to control the lidar based on the irradiation amount and/or the irradiance.

The acquisition module 101 and the control module 102 in the lidar control device in this embodiment can be used to implement the technical solutions of the embodiments shown in FIG. 1 to FIG. 11 in the foregoing method embodiments, and its implementation principles and technical effects are similar, and will not be repeated here.

Figure 14:
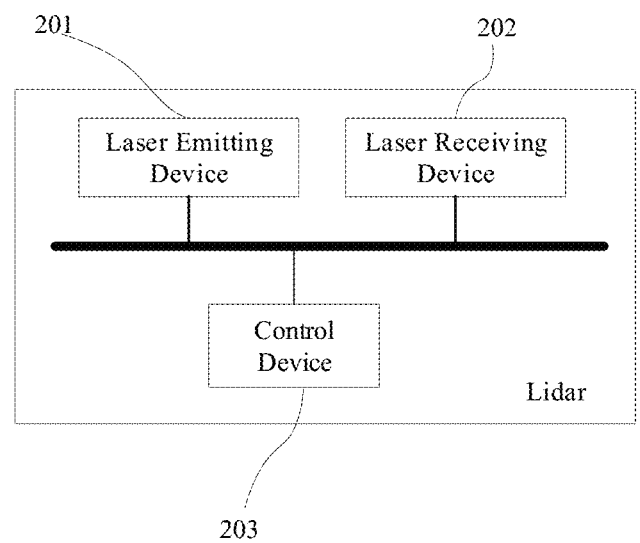
FIG. 14 is a schematic structural diagram of a lidar according to an embodiment of the present disclosure.

FIG. 14 is a schematic structural diagram of a lidar according to an embodiment of the present disclosure. Referring to FIG. 14, an embodiment of the present disclosure provides a lidar including a laser emitting device 201 configured to emit a laser beam, a laser receiving device 202 configured to receive the laser beam returned by the laser irradiated object, and a lidar control device 203 in any of the foregoing embodiments configured to control the laser emitting device to emit a laser beam.

The lidar in this embodiment can be used to implement the technical solution of the embodiment shown in FIG. 12 above, and its implementation principles and technical effects are similar, and will not be repeated here.

Figure 15:
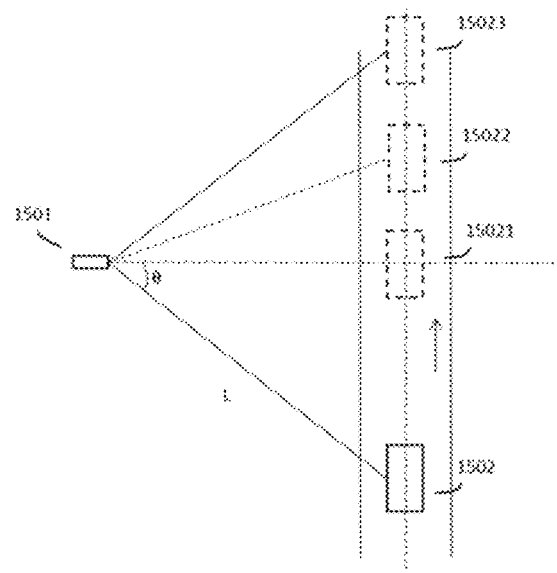
FIG. 15 is a schematic diagram of a relative position of a target when moves within a radiation range formed by the lidar according to an embodiment of the present disclosure.

As shown in FIG. 15, an embodiment of the present disclosure provides a lidar control method. A lidar 1501 can be configured to emit a laser beam to a target area, and calculate the relative position information between a target 1502 and the lidar 1501 in the target area through a reflected beam of the target 1502 in the target area. The relative position information may include, but is not limited to, distance, relative orientation, relative speed, and relative acceleration. To prevent the long-term radiation of the lidar 1501 from damaging the target 1502, it is also important to estimate the time that the target 1502 is within the radiation range of the 1501 and the radiance during this time. In FIG. 15, the target 1502 will enter the radiation area of the lidar 1501 at a certain speed v. The distance from the lidar 1501 to the target 1502 can be obtained by processing the echo signal of the lidar 1501 using a method such as the TOF method, the Kalman filtering method, etc. In this embodiment, it is important to obtain the distance L, the relative orientation angle θ, and the initial velocity and acceleration of the target 1502 from the lidar 1501 to the target 1502 for the first time because the time the target 1502 stays in the radiation area can be estimated thereof, thereby estimating the irradiation amount of the target 1502. In FIG. 15, after the target 1502 is captured for the first time, it passes through a position 15021 and a position 15022 to each a position 15023, and the position 15023 can be considered as the position where the target 1502 leaves the lidar 1501 radiation area.

The current laser energy attenuation rate per unit of distance can be obtained by looking up a table, historical experience values, or actual measurement. The attenuation rate can be calculated from the outgoing beam intensity and the receiving beam intensity.

The attenuation rate can be calculated by the following empirical formula:

$$\text{delt} = \log \frac{W(R)}{W(T)},$$

where delt is the attenuation rate of the laser beam through a unit of distance, W(T) is the light energy emitted by the laser, and W(R) is the light energy received by the receiver after the beam is attenuated per unit of distance.

The time that the target stays in the radiation area may be $$t1 = \frac{2L\sin\theta}{v}$$

where t1 is the time the target stays in the radiation area, L is the distance when the lidar captures the target for the first time, θ is the relative orientation angle when the target is captured for the first time, and v is the relative speed when the target is captured for the first time.

The instantaneous irradiance of the target in the radiation area may be expressed as $$\Psi(t) = \left(\frac{L\cos\theta}{L\sin\theta - vt}\right) * \Psi(t0) * 10^{delt},$$

where $\Psi(t0)$ is the outgoing beam irradiance when the lidar captures the target, $$\frac{L\cos\theta}{L\sin\theta - vt}$$

is the distance correction factor, $10^{delt}$ and is the attenuation factor.

Based on this estimate, the amount of radiation received by the target may be the integral of the instantaneous irradiance with respect to the time, and the instantaneous irradiance may also be related to the distance between the target and the lidar.

The formula for calculating the irradiation amount may be:

$$\Gamma(t) = \int_0^{t1} \Psi(t) dt$$

Based on this, the irradiation amount received by the target can be estimated. If the irradiation amount is greater than the maximum allowable irradiation amount, the lidar output power can be reduced.

The target object in this embodiment may refer to a target object detected by the lidar, which may also include a human body or other biological bodies. For simplicity, FIG. 15 discusses the case where the object's moving direction is perpendicular to the lidar radiation direction. When the moving direction of the object is not perpendicular to the direction of the lidar radiation, the irradiation amount received by the object can be calculated by the energy projection of the lidar in the direction perpendicular to the moving direction of the object.

Figure 16:
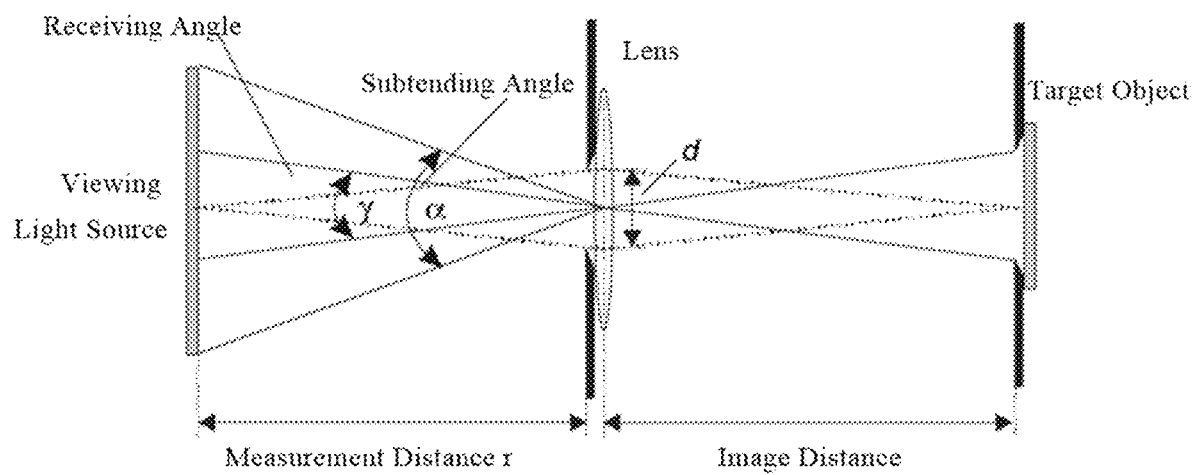
FIG. 16 is a schematic diagram of a test principle of the attenuation rate according to an embodiment of the present disclosure.

In some embodiments, as shown in FIG. 16, the lidar can be used as a viewing light source, which can emit a laser beam to the surface of the target through the aperture d on the lens. More specifically, the laser beam can be irradiated to the effective area of the target through the aperture d, and the surface of the target can reflect the received laser beam. The reflected laser beam returns to the lidar through the aperture d, and the reflected laser beam can form a receiving angle γ between the lens and the viewing light source. In some embodiments, the size of the receiving angle γ may be less than or equal to the size of the subtending angle α which may be the angle range formed by the center point of the lens and the two end points of the viewing light source.

In some embodiments, in the process of the laser beam reaching the target through the lens and reflecting by the target to return to the lidar, there may be a certain degree of attenuation of the laser beam energy. The attenuation rate of the laser beam can be related to factors such as the lens aperture d, the receiving angle γ, the measurement distance r, and the image distance, where the measurement distance r may be the distance between the light source and the lends, and the image distance may be the distance between the lens and the target. More specifically, based on the above factors, historical experience values can be used to determine the attenuation rate of the lidar outgoing beam. Alternatively, the above factors and the wavelength of the laser beam can be combined to determine the attenuation rate of the lidar outgoing beam. Of course, those skilled in the art can also use the same or other similar methods to determine the attenuation rate of the lidar outgoing beam, as long as the accuracy of the determination of the attenuation rate of the lidar outgoing beam can be ensured, which will not be repeated herein.

In some embodiments, the lidar may be mounted on a fixed gimbal and used to emit a detecting light to detect the area around the gimbal.

In some embodiments, the lidar may be mounted on a vehicle and used to emit the detection light to detect the area around the vehicle. The vehicle may include an unmanned vehicle or a vehicle equipped with an ADAS system.

In some embodiments, the lidar may be mounted on an unmanned aerial vehicle and used to emit the detection light to detect designated areas.

An embodiment of the present disclosure further provides a storage medium. The storage medium may be a computer-readable storage medium, and the computer-readable storage medium can store program instructions. The program instructions can be used to implement the lidar control method in any one of the foregoing embodiments.

The method proposed based on the embodiments of the present disclosure can prevent the human body and objects in the laser irradiated area from being exposed to excessive radiation to a certain extent. In particular, it can effectively protect human eyes and the safety of vulnerable parts such as the skin from being directly exposed to the laser radiation.

The technical solutions and technical features in the foregoing various embodiments of the present disclosure may be separate or combined when there is no confliction. Equivalent embodiments are within the scope of the present disclosure as long as they do not exceed the knowledge scope of those skilled in the art.

In the several embodiments provided by the present disclosure, it should be understood that the disclosed system, apparatus, and method may be implemented in other manners. For example, the device embodiments described above are merely illustrative. For example, the division of the units is only a logical function division. In actual implementation, there may be another division manner, for example, multiple units or components may be combined or integrated into another system. Some features can be omitted or not executed. In addition, the coupling or direct coupling or communication connection shown or discussed may be an indirect coupling or communication connection through some interface, device or unit, and may be electrical, mechanical or otherwise.

The units described as separate components may or may not be physically separated, and the components displayed as units may or may not be physical units, that is. They may be located in one location or may be distributed to multiple network units. Some or all of the units may be selected according to actual needs to achieve the purpose of the solution of the embodiment.

Further, each functional unit in each embodiment of the present disclosure may be integrated into one processing unit, or each unit may exist physically separately, or two or more units may be integrated into one unit. The above integrated unit may be implemented in the form of hardware or in the form of a software functional unit.

The integrated unit, if implemented in the form of a software functional unit and sold or used as a standalone product, may be stored in a computer readable storage medium. Based on such understanding, the technical solution of the present disclosure, or all or part of the technical solution, may be embodied in the form of a software product stored in a storage medium, including several instructions for instructing a computer processor 101 (processor) to perform all or part of the steps of the methods of the various embodiments of the present disclosure. The storage medium may include: a U disk, a mobile hard disk, a read-only memory (ROM), a random-access memory (RAM), a magnetic disk, or an optical medium that can store program codes.

The foregoing embodiments are not intended to limit the scope of the present disclosure. Equivalent structures or equivalent process transformations made based on the description and drawings of the present disclosure directly or indirectly applied to other related technologies are all included in the scope of the present disclosure.

It should be noted that the above embodiments are merely illustrative of the technical solutions of the present disclosure, and are not intended to be limiting. Although the present disclosure has been described in detail with reference to the foregoing embodiments, those skilled in the art will understand that the technical solutions described in the foregoing embodiments may be modified, or some or all of the technical features may be equivalently replaced; and the modifications or substitutions do not deviate from the scope of technical solutions of the present disclosure.

What is claimed is:

1. A method for controlling a lidar device comprising:
   obtaining information about a working state of the lidar device;
   when the working state is an unsafe working state, obtaining a first irradiation amount or a first irradiance generated by the lidar device on a laser irradiated object, and activating an abnormal protection strategy to control the lidar device;
   when the working state is a predetermined safe working state, prohibiting an activation of the abnormal protection strategy to skip obtaining of the first irradiation amount or the first irradiance and control of the lidar device;
   wherein the unsafe working state is a state other than the predetermined safe working state, wherein the predetermined safe working state comprises an external non-hazardous abnormal condition, the external non-hazardous abnormal condition comprises one or more of an abnormal condition of rain and snow, an abnormal condition of flying insects, an abnormal condition of sand, or an abnormal condition of floating leaves, and the abnormal protection strategy is used to control the lidar device based on the first irradiation amount or the first irradiance generated by the lidar device on the laser irradiated object.

2. The method of claim 1, wherein the controlling of the lidar device based on the first irradiation amount or the first irradiance includes:
   determining an object type of the laser irradiated object;
   determining a maximum allowable irradiation amount or a maximum allowable irradiance corresponding to the object type based on the object type; and
   controlling the lidar device based on the first irradiation amount and the maximum allowable irradiation amount; or controlling the lidar device based on the first irradiance and the maximum allowable irradiance.

3. The method of claim 2 further comprising:
   controlling the lidar device based on a predetermined control strategy when the first irradiation amount is greater than or equal to the maximum allowable irradiation amount; or
   controlling the lidar device based on the predetermined control strategy when the first irradiance is greater than or equal to the maximum allowable irradiance.

4. The method of claim 3, wherein controlling the lidar device based on the predetermined control strategy includes:
   turning off the lidar device; or reducing a power of a lidar outgoing beam.

5. The method of claim 4, wherein turning off the lidar device includes:
   turning off the power of the lidar device; or closing an outgoing aperture of the lidar device.

6. The method of claim 4, further comprising:
   obtaining a second irradiation amount or a second irradiance generated by the lidar device on the laser irradiated object after reducing the power of the lidar outgoing beam; and
   controlling the lidar device based on the second irradiation amount or the second irradiance.

7. The method of claim 6, wherein controlling the lidar device based on the second irradiation amount or the second irradiance includes:
   turning off the lidar device when the second irradiation amount is greater than or equal to the maximum allowable irradiation amount, or turning off the lidar when the second irradiance is greater than or equal to the maximum allowable irradiance; or
   controlling the lidar device to return to a predetermined normal working state after a predetermined period of time when the second irradiation amount is less than the maximum allowable irradiation amount, and the second irradiance is less than the maximum allowable irradiance.

8. The method of claim 3, wherein controlling the lidar device based on the predetermined control strategy further comprises:
   sending a radiation over-limit signal to a predetermined human-machine interface for the human-machine interface to send warning information to a user based on the radiation over-limit signal.

9. The method of claim 1, wherein obtaining the first irradiation amount or the first irradiance generated by the lidar device on the laser irradiated object includes:
   obtaining relative movement parameter information between the lidar device and the laser irradiated object;
   determining an attenuation rate of the lidar outgoing beam and laser parameter information corresponding to the lidar; and
   determining the first irradiation amount or the first irradiance generated by the lidar device on the laser irradiated object based on the relative movement parameter information, the attenuation rate, and the laser parameter information.

10. The method of claim 9, wherein:
    the relative movement parameter information between the lidar device and the laser irradiated object includes one or more of distance information between the lidar device and the laser irradiated object, position information between the lidar device and the laser irradiated object, relative speed information between the lidar and the laser irradiated object, or relative acceleration information between the lidar device and the laser irradiated object; or, the laser parameter information includes one or more of an initial emission radiation flux, an initial emission beam diameter, a scattering angle, or a transmittance.

11. The method of claim 9, wherein determining the attenuation rate of the lidar outgoing beam includes:
    determining environmental information where the lidar device is positioned and a laser beam wavelength of the lidar; and
    determining the attenuation rate of the lidar outgoing beam based on the environmental information and the laser beam wavelength.

12. The method of claim 11, wherein:
    the environmental information includes one or more of visibility information, atmospheric pressure information, temperature information, or relative humidity information.

13. The method of claim 11, wherein determining the attenuation rate of the lidar outgoing beam based on the environmental information and the laser beam wavelength includes:
    determining the attenuation rate by looking up a table based on the environmental information and the laser beam wavelength, or
    determining attenuation rate by using historical empirical data based on the environmental information, or
    measuring the attenuation rate directly under a current environment.

14. A device for controlling a lidar device comprising:
    a processor; and
    a memory storing program instructions that, when being executed by the processor, cause the processor to:
    obtain information about a working state of the lidar device;
    when the working state is an unsafe working state, obtain a first irradiation amount or a first irradiance generated by the lidar on a laser irradiated object, and activate an abnormal protection strategy to control the lidar device;
    when the working state is a predetermined safe working state, prohibiting an activation of the abnormal protection strategy to skip obtaining of the first irradiation amount or the first irradiance and control of the lidar device;
    wherein the unsafe working state is a state other than the predetermined safe working state, wherein the predetermined safe working state comprises an external non-hazardous abnormal condition, the external non-hazardous abnormal condition comprises one or more of an abnormal condition of rain and snow, an abnormal condition of flying insects, an abnormal condition of sand, or an abnormal condition of floating leaves, and the abnormal protection strategy is used to control the lidar device based on the first irradiation amount or the first irradiance generated by the lidar device on the laser irradiated object.

15. The device of claim 14, wherein the controlling of the lidar device based on the first irradiation amount or the first irradiance comprises:
    determining an object type of the laser irradiated object;
    determining a maximum allowable irradiation amount or a maximum allowable irradiance corresponding to the object type based on the object type; and
    controlling the lidar based on the first irradiation amount and the maximum allowable second irradiance; or, control the lidar based on the first irradiance and the maximum allowable irradiance.

16. The device of claim 15, wherein the processor is further configured to:
    control the lidar based on a predetermined control strategy when the first irradiation amount is greater than or equal to the maximum allowable irradiation amount; or,
    control the lidar based on the predetermined control strategy when the first irradiance is greater than or equal to the maximum allowable irradiance.

17. The device of 16, wherein when controlling the lidar based on the predetermined control strategy, the processor is configured to:
    turn off the lidar; or reduce a power of a lidar outgoing beam.

18. A lidar apparatus comprising:
    a laser emitting device;
    a laser receiving device; and
    a lidar control device configured to control the laser emitting device to emit a laser beam, the lidar control device including a processor and a memory storing program instructions that, when being executed by the processor, cause the processor to:
    obtain information about a working state of the lidar;
    when the working state is an unsafe working state, obtain a first irradiation amount or a first irradiance generated by the lidar on a laser irradiated object, and activate an abnormal protection strategy to control the lidar;
    when the working state is a predetermined safe working state, prohibit an activation of the abnormal protection strategy to skip obtaining of the first irradiation amount or the first irradiance and control of the lidar apparatus;
    wherein the unsafe working state is a state other than the predetermined safe working state, wherein the predetermined safe working state comprises an external non-hazardous abnormal condition, the external non-hazardous abnormal condition comprises one or more of an abnormal condition of rain and snow, an abnormal condition of flying insects, an abnormal condition of sand, or an abnormal condition of floating leaves, and the abnormal protection strategy is used to control the lidar based on the first irradiation amount or the first irradiance generated by the lidar on the laser irradiated object.

* * * * *